United States Patent [19]
Allen et al.

[11] Patent Number: 5,402,032
[45] Date of Patent: Mar. 28, 1995

[54] TRAVELING WAVE TUBE WITH PLATE FOR BONDING THERMALLY-MISMATCHED ELEMENTS

[75] Inventors: Curtis G. Allen, Hayward; David H. Perrone, Redwood City; David M. Rossi, San Francisco, all of Calif.

[73] Assignee: Litton Systems, Inc., Beverly Hills, Calif.

[21] Appl. No.: 968,416

[22] Filed: Oct. 29, 1992

[51] Int. Cl.⁶ ............................................. H01J 23/30
[52] U.S. Cl. ..................... 315/3.5; 315/39.3; 333/22 R
[58] Field of Search ............. 315/3.5, 3.6, 39.3; 333/22 R

[56] References Cited

U.S. PATENT DOCUMENTS

| | | | |
|---|---|---|---|
| 3,181,023 | 4/1965 | Hant et al. | 315/3.5 |
| 3,717,787 | 2/1973 | Doyle | 315/3.5 |
| 4,019,087 | 4/1977 | Hamada et al. | 315/3.5 |
| 4,105,911 | 8/1978 | King et al. | 315/3.5 |
| 4,147,956 | 4/1979 | Horigome et al. | 315/3.5 X |
| 4,455,507 | 6/1984 | Greco et al. | 315/3.5 |
| 4,532,190 | 7/1985 | Kanbe et al. | 428/627 |
| 4,711,386 | 12/1987 | Mizuhara | 228/121 |
| 4,950,558 | 8/1990 | Sarin | 428/698 |

FOREIGN PATENT DOCUMENTS

| | | |
|---|---|---|
| 0097944 | 1/1984 | European Pat. Off. . |
| 84033 | 2/1963 | France . |
| 2334196 | 7/1977 | France . |
| 2444729 | 4/1976 | Germany . |
| 128635 | 8/1983 | Japan .................................. 315/3.5 |
| 982160 | 2/1965 | United Kingdom . |
| 982170 | 2/1965 | United Kingdom ................. 315/3.5 |
| 1515329 | 6/1978 | United Kingdom . |

*Primary Examiner*—Benny T. Lee
*Attorney, Agent, or Firm*—Elliott N. Kramsky

[57] ABSTRACT

A method for bonding thermally-mismatched elements of a traveling wave tube employs a metallic plate of undulating character. The plate is located at the region of the interface between tube elements formed of materials of materially-differing thermal character such as the ceramic termination piece and an adjacent sever pole piece of copper. Through either a brazing or a sintering process, pluralities of bonds are formed at points of tangency between the plate and the two elements of differing thermal expansion coefficients. As a result, a good heat flow path, accompanied by a more stable r.f. interface, is formed between the materials that is not subject to fracture as are prior art diffusion bonds.

3 Claims, 4 Drawing Sheets

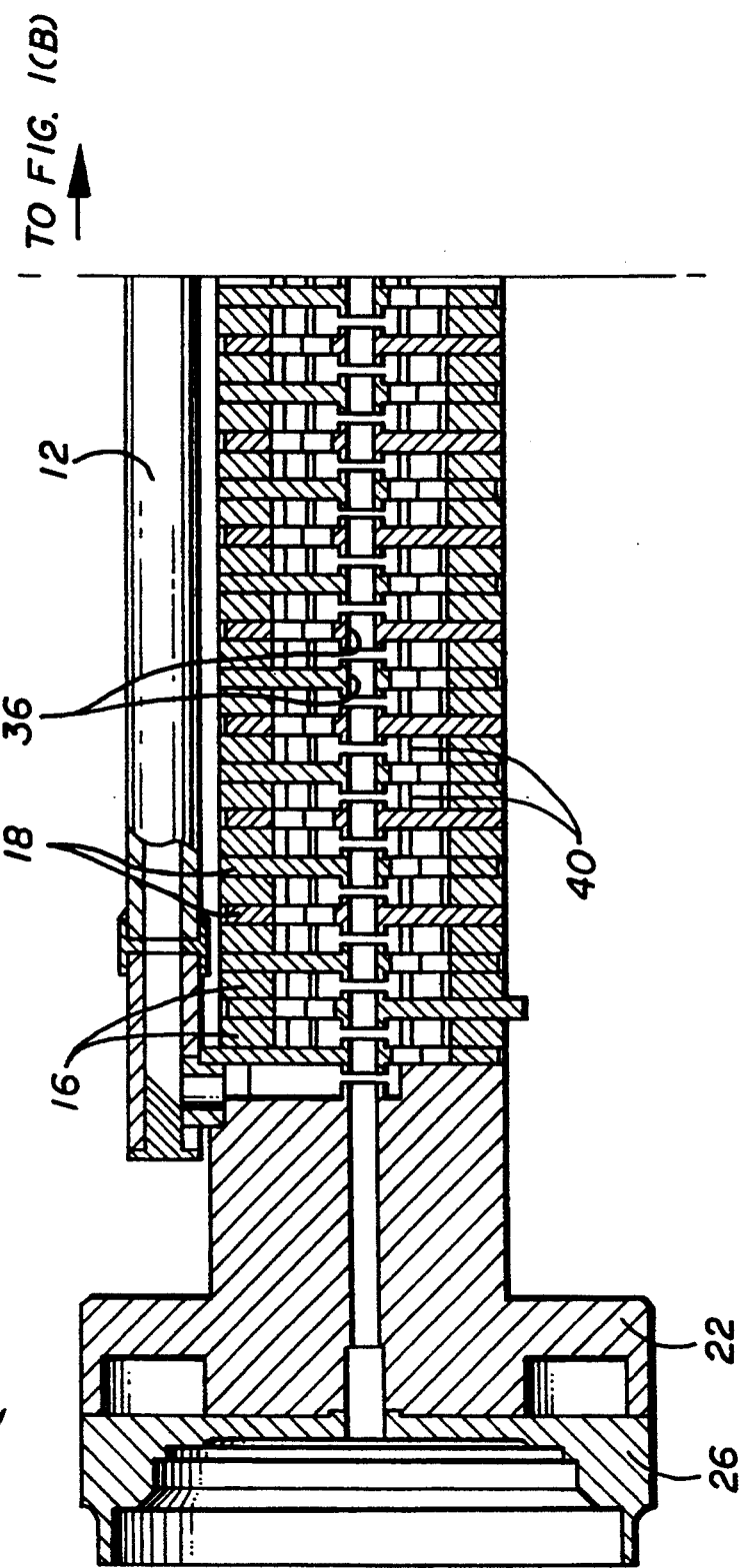

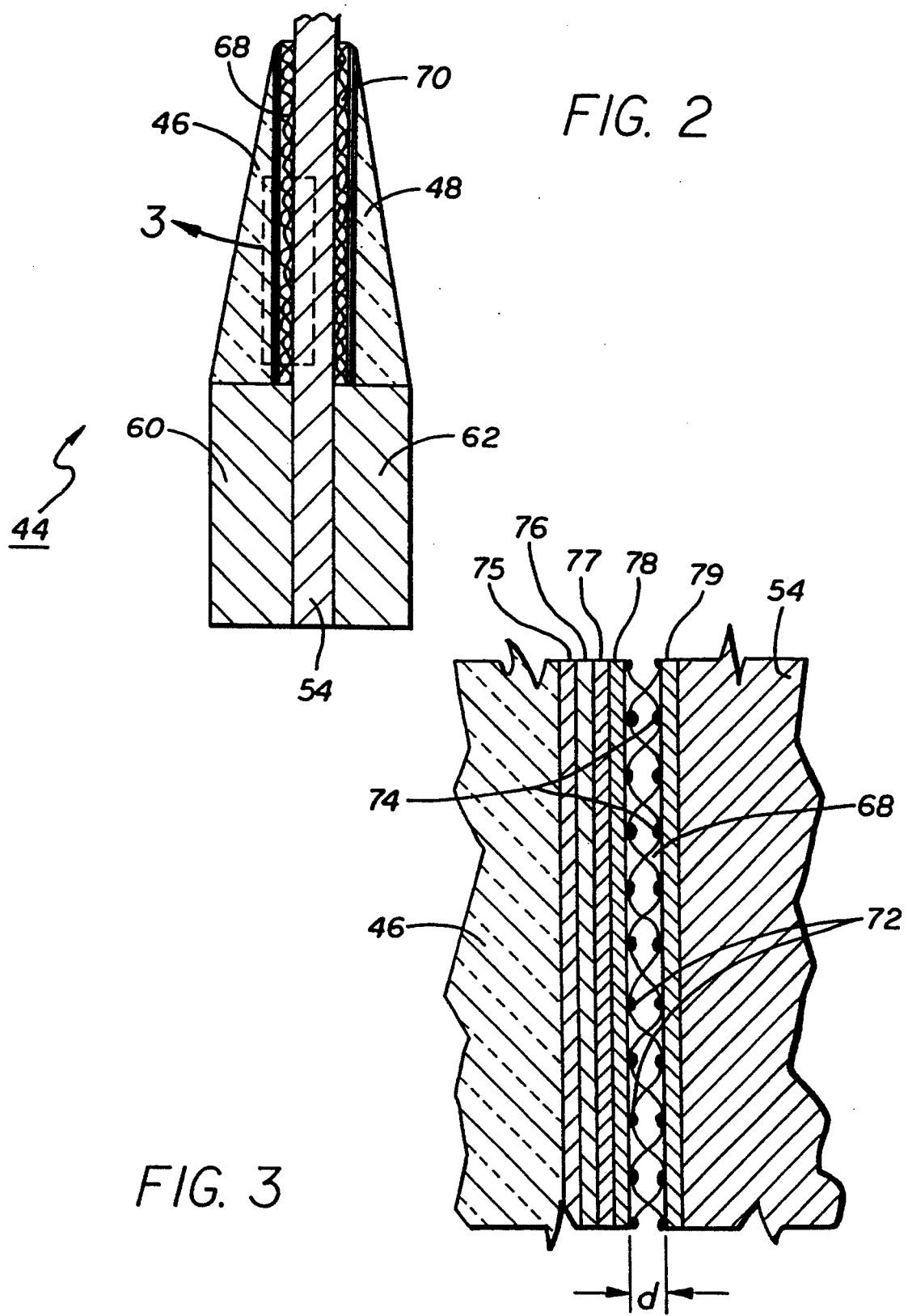

TRAVELING WAVE TUBE WITH PLATE FOR BONDING THERMALLY-MISMATCHED ELEMENTS

BACKGROUND

1. Field of the Invention

The present invention relates to methods for fabricating r.f. apparatus of the coupled cavity traveling wave tube type. More particularly, this invention pertains to a method for bonding thermally-mismatched elements whereby temperature-related stressing and impedance mismatches are reduced.

2. Description of the Prior Art

The traveling wave tube is a vacuum device which serves as an amplifier of microwave frequency energy. It relies upon the energy interaction that can occur between an electron beam and a microwave frequency signal. The microwave signal propagates along a slow wave structure that causes it to traverse an extended distance between two axially spaced points. This reduces the effective lateral propagation velocity from that of light to that of the electron beam velocity and transfers energy from the beam to the signal. By lowering the propagation velocity, an energy coupling is caused to take place between the beam and the microwave signal that amplifies the microwave frequency energy.

The conventional coupled cavity type traveling wave tube comprises an arrangement of interconnected cells that are serially disposed and adjacent one another along a common axis. A plurality of axially aligned passages through the cavities permits passage of the beam and each interaction cavity is coupled to an adjacent cavity by means of a coupling aperture in an endwall. Conventionally, the coupling apertures between adjacent cavities are alternately disposed on opposite sides of the electron beam axis. An electron gun containing a cathode is located within the tube for furnishing a source of electrons that are formed into a beam and directed along a straight path through the cavity passages. The electromagnetic interaction occurs along the electron beam and the microwave signal appearing at the cavity proximate the beam.

The beam is confined or focussed to the axial path by magnetic means to minimize spreading. So-called pole pieces define the cavities and walls of the slow wave structure while magnets positioned outside the vacuum region of the tube provide the magnetic flux. Protruding ferrules project from the front and back sides of the pole piece walls, serving to surround the electron beam passage and providing a concentrated, axially-extending magnetic field between the ferrule of one pole piece and that of an adjacent pole piece. The beam passage formed in the pole piece between the ends of the ferrules functions as a drift tube region.

In addition to the above-described structure, a common tube structure also includes one or more termination pieces for absorbing spurious microwave signal energy. Such termination pieces, formed of an appropriate ceramic material such as aluminum nitride or beryllium oxide impregnated with silicon carbide eliminate undesired signal reflection in the tube that result from beam-cavity interaction and from passive devices coupled to the input and output ends thereof. Such element(s) are located within a termination cavity that can include metallic elements such as sever and termination pole pieces. Depending upon the type of tube employed, the pole pieces may be of either iron (magnetic) or copper (non-magnetic) composition in accordance with the chosen mechanism for focussing the electron beam. In either case, significant problems of both an operational and a mechanical nature can arise as a result of heating due to the absorption of r.f. energy by the ceramic termination piece. It has been observed that the characteristic impedance of the termination piece is altered at high temperatures. This can result in a mismatch with the rest of the tube at elevated temperatures which will degrade effective operation. Undesired reflection of r.f. energy can cause the tube to oscillate, thereby significantly degrading its utility in applications that require precision switching. Tube designs therefore seek to contact the ceramic termination with metallic elements that function in part as heat sinks.

Accordingly, the ceramic termination is bonded to metallic elements such as pole pieces and spacers in numerous tube arrangements. In the prior art, such bonds have been achieved by sintering or brazing the elements directly to one another. The resulting so-called diffusion-type bonds are subject to failure when exposed to the significantly elevated temperatures often encountered during tube operation due to the significantly different thermal expansion coefficients of the interfacing materials. The thermally induced stresses that can occur at the bonding interface can result, for example, in fracture of the ceramic terminations which can degrade the tube's operation by reflecting the r.f. energy. Fractured chips may also fall into the electron beam hole, causing defocussing and excessive gas. In addition, other elements of the conventional traveling wave tube may require the bonding of materials of distinctly differing thermal expansion characteristics and, as mentioned earlier, in view of the high power levels often handled, such bonds can be subjected to thermal stressing that may result in device failure.

SUMMARY OF THE INVENTION

The preceding and other disadvantages of the prior art are addressed by the present invention that provides an improved method for bonding a first element to a second element where the elements are characterized by materially differing coefficients of thermal expansion. Such method includes forming a plurality of undulations in a plate of predetermined metallic material. Thereafter, the plate is inserted into the region of the interface between the elements. The aforesaid arrangement is then heated to a predetermined temperature that exceeds the melting point of the predetermined metallic material and such arrangement is then cooled until the bond is hardened.

In a second aspect, the invention provides apparatus for bonding a first element to a second element where each element includes a metallic component and the elements are characterized by materially different coefficients of thermal expansion. A plate of predetermined metallic composition has a plurality of undulations and is located in the region of the interface between the elements so that pluralities of points of tangency are formed between the plate and the first and second elements. Bonds are formed between the elements and the plate at the points of tangency whereby the elements are bonded to one another.

In a third aspect, the invention provides a traveling wave tube. The tube includes a slow wave structure comprising a plurality of longitudinally-aligned cavities. Each of the cavities is defined by a substantially parallel pair of pole pieces forming endwalls. Each pole piece includes a central aperture and an off-axis aperture. The central apertures of adjacent pole pieces are aligned along the longitudal axis of the tube and the off axis apertures are disposed above and below the axis on alternate pole pieces. A gun is provided for launching an electron beam along the longitudinal axis of the tube. An input to the tube is provided for receiving r.f. energy and an output is provided for distributing amplified r.f. energy from the tube.

A termination is provided for absorbing r.f. energy within the tube. The termination comprises a termination piece of substantially ceramic material and at least one element of metallic composition arranged to act as a heat sink for effecting the operational temperature of the ceramic termination piece. A plate of predetermined metallic composition has a plurality of undulations. Such plate is located at the region of the interface between the termination piece and the metallic element whereby pluralities of points of tangency are formed between the plate, the termination piece and the metallic element. Finally, the plate is bonded to the termination piece and to the metallic element at the points of tangency.

The preceding and other features and advantages of this invention will become further apparent from the detailed description that follows. This detailed description is accompanied by a set of drawing figures. Numerals of the drawing figures, corresponding to those of the written text, point to the features of the invention. Like numerals refer to like features throughout both the written text and the drawing figures.

BRIEF DESCRIPTION OF THE DRAWINGS

FIGS. 1(A) and 1(B) provide, in combination, a side sectional view of a coupled cavity traveling wave tube of the type that is amenable to the fabrication processes of the invention;

FIG. 2 is an enlarged view of the termination portion of the traveling wave tube of FIG. 1;

FIG. 3 is a greatly enlarged view of the interfacing regions of the sever pole piece and a termination piece and including a waffle plate in accordance with the invention taken within the dashed boundary 3 of FIG. 2.

DETAILED DESCRIPTION OF THE PREFERRED EMBODIMENT

Figure 1B:
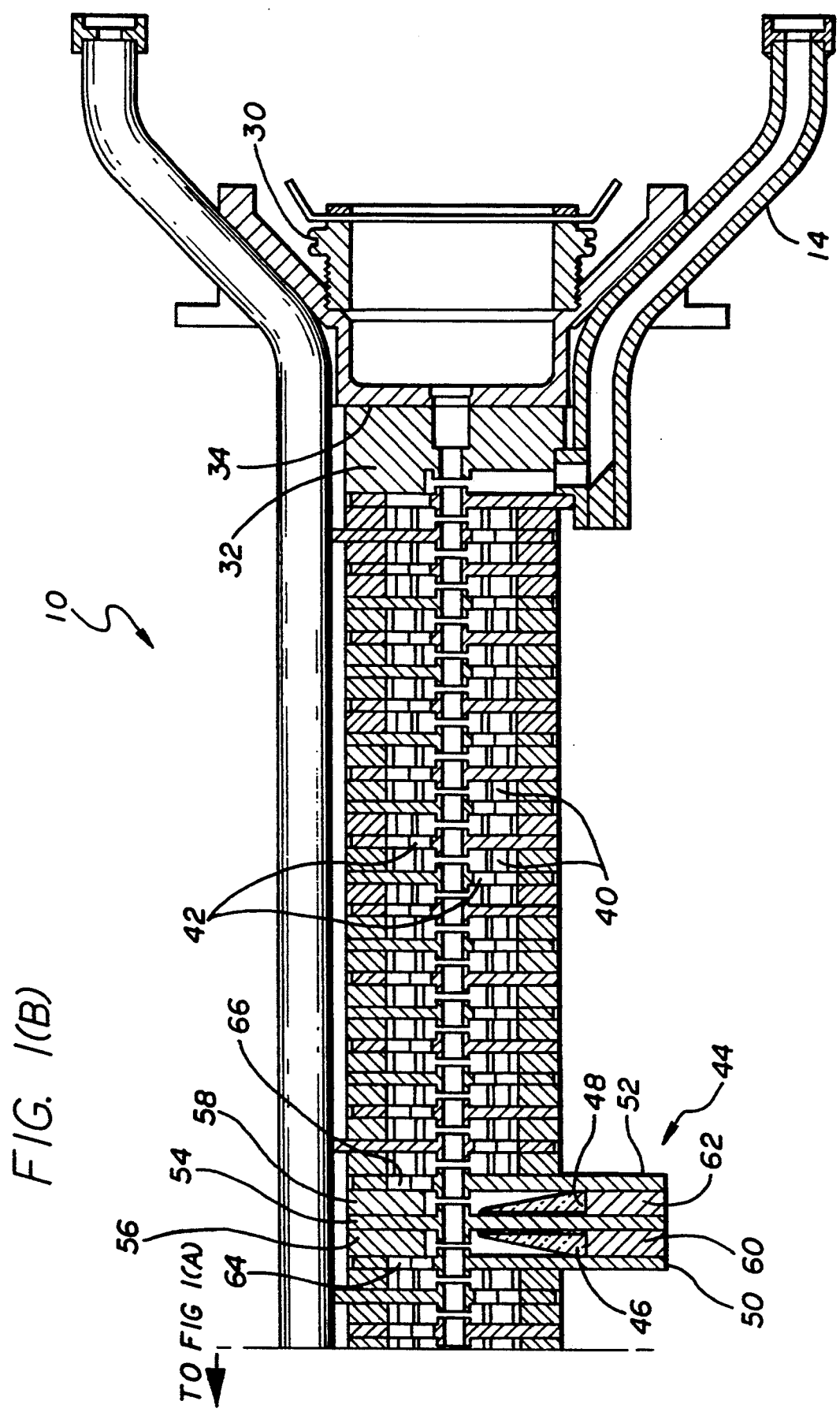

FIGS. 1(A) and 1(B) provide, in combination, a side sectional view of a representative coupled cavity traveling wave tube 10 of the type that includes arrangements of elements amenable to the fabrication processes discussed below. Input r.f. energy is received through an input waveguide 12 to the body of the tube 10 which functions as a slow wave structure for propagating an electromagnetic wave with a phase velocity substantially less than the velocity of light and substantially equal to the velocity of an electron beam. The high energy amplified r.f. output of the tube 10 is taken through an output waveguide 14.

An electron gun assembly is coupled to an input coupler assembly 22 and includes a gun pole piece 26. The gun assembly generates and propels a beam of electrons along the longitudinal axis of the tube 10 and includes both a cathode and an anode (neither is shown). The cathode functions as a source of electrons and the anode focusses and directs the beam along the predetermined beam axis. A collector insulator assembly 30 and an output coupler 32 are fixed to the opposed or output end of the tube 10. The output coupler 32 includes a collector pole piece 34. The collector assembly gathers electrons from the beam that have passed through the tube's interaction region.

Pole pieces 18 of non-magnetic metallic composition such as copper interact with electromagnets (not shown) to focus the electron beam as it travels through the interior channel formed by the aligned central cylindrical passages 36 of the pole pieces 18. The coupler assembly and the output waveguide 14 include microwave transparent seals for maintaining a vacuum within the tube 10. The electromagnets are an alternative to a beam focusing mechanism of the type that includes permanent magnets in combination with pole pieces of ferromagnetic material. The electromagnets are driven so that oppositely-poled fields are generated at all times on opposite faces of common pole pieces 18.

The pole pieces 18, in combination with the electromagnets and the spacers 16 form and define axially spaced interaction cavities 40. Such cavities 40 are coupled through coupling holes 42 located off-axis of the central electron beam passage with the kidney-shaped apertures 42 for passage of the r.f. energy located above and below the beam passage on alternating pole pieces 18.

A termination 44 is provided within the tube 10 for preventing the undesired reflection of r.f. signal energy. The termination 44 includes a first ceramic termination piece 46 and a second ceramic termination piece 48 for absorbing forward directed and reflected r.f. energy respectively. Undesired r.f. signal energy will generally be found to increase as a consequence of the impedance mismatches involving the passive elements of microwave devices coupled to the input 12 and to the output 14 of the tube 10. In addition to the ceramic termination pieces 46 and 48, the termination 44 includes termination pole pieces 50 and 52 of appropriate metallic material such as copper, a centrally-located sever pole piece 54, also of metallic composition, upper termination spacers 60 and 62 and lower termination spacers 56 and 58, each of which is also of metallic composition, preferably copper.

In operation, the termination 44 acts to absorb microwave energy. Forwardly-directed energy enters the termination through the kidney-shaped aperture 64 of termination pole piece 50 while reflected energy enters through the aperture 66 of termination pole piece 52. As mentioned earlier, such energy is absorbed at the termination pieces 46 and 48 respectively.

During high power applications, the temperatures of the ceramic termination pieces 46 and 48 can rise to approximately 400 degrees Celsius in an arrangement in accordance with FIG. 1. This represents a net value as, absent dissipation of heat through the various metallic heat sinks, the absorbed r.f. energy would be sufficient to cause localized heating of areas of the ceramic pieces 46 and 48 to about 600 degrees Celsius and this is then reduced by about 200 degrees Celsius by heat flows to the copper sever pole piece 54, the termination pole pieces 50 and 52 and the lower spacers 60 and 62. (It can be assumed that, in the worst case, the termination 44 will see about 200 watts of r.f. power. This is based upon the assumption that the tube 10 produces about 2,000 watts average power.)

As mentioned earlier, the r.f. characteristic impedance of the termination 44 changes when excessive heating takes place, and, in fact, at high temperatures it will out-gas, weakening the vacuum within the tube 10 and leading to defocussing of the electron beam. Thus, while the impedance of the termination 44 may be identical to that of the tube 10 at relatively low temperatures, the occurrence of excessive heating could disturb impedance matching in the tube 10 and result in the reflection of r.f. energy that would otherwise have been absorbed. As mentioned earlier, this can lead to oscillations within the tube 10 that can render it unusable. Additionally, the boundary conditions of the metallic termination pole pieces 50 and 52 may be affected. Accordingly, it is essential that sufficiently intimate contact be made between the ceramic termination pieces 46 and 48 and the metallic elements capable of acting as heat sinks to maintain the temperatures of the ceramic elements within tolerable limits.

While various metallic elements of the termination 44 are in intimate contact with the ceramic terminations 46 and 48 to facilitate their abilities to function as heat sinks, the brazing or sintering of the bonds joining ceramic termination pieces 46 and 48 directly to those metallic elements has produced element interconnections that can experience failure as a result of the high power (and therefore high temperature) environment of the termination 44. Such failures have been a function of the significantly different coefficients of thermal expansion of the ceramic and metallic elements of the termination 44.

The above problem has been addressed by the present invention that overcomes the potential of fracturing of bonds between thermally mismatched materials in an environment such as a coupled cavity traveling wave tube wherein intense heating can take place of bonded elements fabricated of thermally-mismatched materials.

FIG. 2 is an enlarged view of the lower half of the termination 44 of the traveling wave tube 10. As can be seen, wafers 68 and 70 having pluralities of surface undulations are interposed at the interfaces of the metallic sever pole piece 54 with the ceramic termination pieces 46 and 48 respectively. The undulating textures of the wafers 68 and 70 may be attained by rolling an embossing knurl rod over a 0.001 inch thick sheet of annealed copper or other malleable material. It should be noted that the wafers 68 and 70 do not continue the entire length of the pole piece 54 as the spacers 60 and 62 are of like metallic composition, and therefore of like thermal character, to the sever pole piece 54. While the direct or diffusion brazing or sintering of bonds between the copper sever pole piece 54 and the copper spacers 60 and 62 is not hampered by the stresses that occur between materials of dissimilar thermal compositions, it will be seen from the discussion below that, in some uses, the wafers 68 and 70 may continue the entire length of the sever pole piece 54 and thus be interposed between the elements fabricated of materials of like thermal character.

Figure 4:
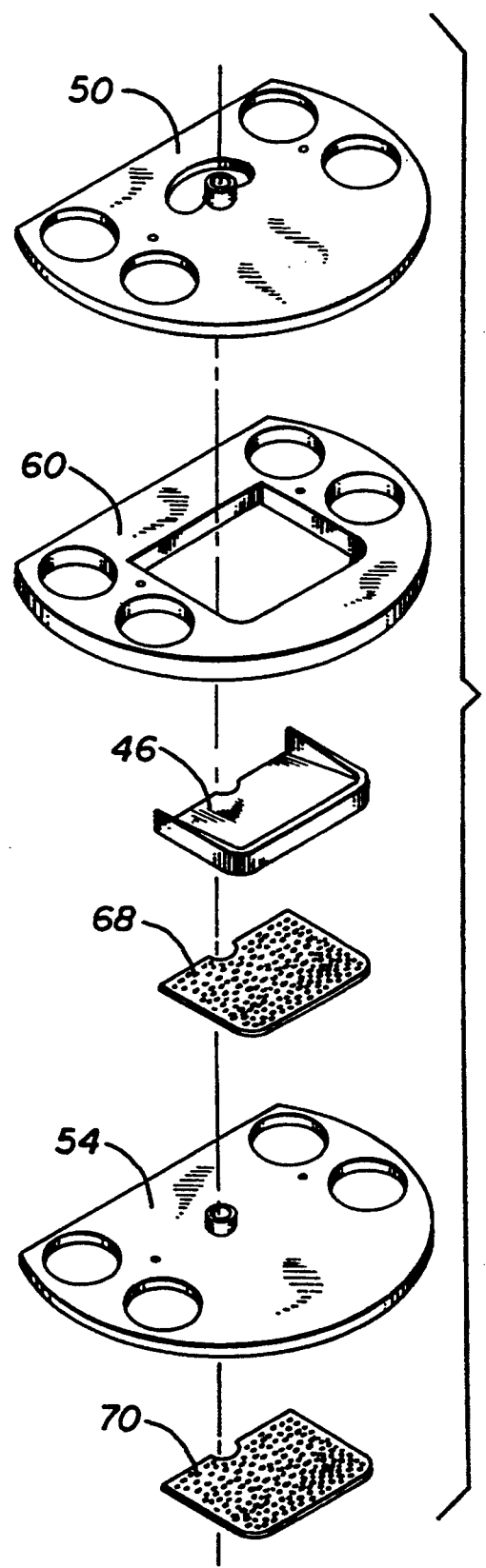
FIG. 4 is an exploded perspective view of the assembly for engaging the sever pole piece to the termination piece, including a wafer with surface undulations in accordance with the invention.

FIG. 4 is an exploded perspective view of the aforementioned assembly for engaging the sever pole piece 54 to the termination piece 46. As can be seen the plate or wafer 68 is grossly planar.

In the invention, the interposition of the wafers 68 and 70 between thermally-mismatched elements, "softens" such interfaces to prevent the bond ruptures that result from thermally-inducted stressing of the "direct" bonds of the prior-art. The undulating surfaces of the wafers 68 and 70, each presenting a texture comprising a plurality of discrete convex elements on the opposed sides thereof, are formed of-malleable metal or other material. When inserted at the interface between a termination piece and the sever pole piece, such undulations form opposed pluralities of discrete points of tangency between the wafer and termination piece and the wafer and pole piece. Such points of tangency provide the loci of "mini-bonds" for fixing the ceramic element to the metallic elements. In the event that the wafer is sintered or brazed to the mismatched elements at the points of tangency, considerable thermal or mechanical movement can occur between those elements without any degradation of the r.f. or thermal interface. The interposition of the plates 68 and 70 is also very forgiving of dimensional reducing process and execution related failures. Additionally, in light of its 400 degree Centigrade operating environment, the plurality of undulations will remain annealed permitting it to give and take more freely as the dissimilar materials grow and shrink.

FIG. 3 is a greatly enlarged view of the interface region between the ceramic termination piece 46 and the sever pole piece 54 as defined by the dashed outline "3" of FIG. 2. The maximum utility of the present invention is realized when it is desired to bond a ceramic element, such as the termination piece 46 to a metal of high thermal conductivity such as a sever pole piece 54 of copper. This is due to the significant mismatch in the thermal expansion coefficients of the two materials and the need to create a thermal path between the copper sever pole piece 54 and the ceramic termination piece 46 so that the pole piece 54 can act as a heat sink. Further, by providing a "soft" junction between elements it is possible to obtain a superior tube design and performance. That is, a designer need not be limited in choosing the composition of the metallic sever pole piece 54 to be a metal, such as molybdenum, whose thermal expansion coefficient closely matches that of the ceramic termination piece 46. Rather, the wafer 68 provides sufficient "give" to remove consideration of thermal stressing from material selection.

The invention further enhances formation of a bond between thermally mismatched materials when one of those elements is a ceramic or other material that neither wets (i.e., brazing alloy does not adhere or flow on it) nor adheres to braze alloys. In the invention, the bond consists of two separate bond components (ceramic to wafer and wafer to metal) that can be addressed individually. An appropriate metallization can be employed on the hard-to-wet ceramic that forms a eutectic or lower melting point alloy with the wafer 68. The undesired leeching of metal atoms from the ceramic element 46 that can sometimes occur in the prior art during diffusion or direct brazing of certain materials to one another can in this case be prevented by careful selection of the material of the wafer and the materials used to attach the wafer to the ceramic. For example, a high power BeO—SiC or AlN—SiC termination piece 46 can be thermally and r.f. grounded by metallizing the termination piece 46 with a bonding layer 76 of titanium, a diffusion barrier layer 77 of molybdenum, overcoated with a final layer 78 of silver. The layer 78 may also comprise NiCuSil, CuSil, Ag or other brazing alloy. In the event that the wafer 68 is of copper, the copper and silver will alloy at their eutectic temperature on the termination side as indicated by the alloys at the points of tangency 72. If AlN—SiC (aluminum nitride impregnated with silicon carbide) or some other non-oxide bearing ceramic is used then an oxide adhesion layer 75 must be formed on the ceramic by, for example, air firing the aluminum nitride at an elevated temperature. The oxide layer provides adhesion between the ceramic and the Ti layer. By air firing the device to form the oxide adhesion layer 75 the inventors have accomplished a bond (titanium to aluminum nitride) that has not been previously attained in the art.

The other element in the "sandwich" may be almost any other material. In the event that a copper sever pole piece 54 is employed then a conventional silver, NiCuSil, other CuSil or alloying brazed material may be employed to form the braze alloy at the points of tangency 74. The copper sever pole piece 54 is preferably coated with a layer 79 of silver formed either by deposition thereof or by the use of silver shim stock.

The assembly described above is clamped and heated to a temperature just below the melting temperature of Cu and Ag. As a result, a eutectic is formed, bonding the Cu and Ag interfaces on either side of the wafer 68.

While the benefits of the invention rely upon the use of the wafer 68 to provide separation, while maintaining thermal conductivity, between the ceramic termination piece and the copper sever pole piece, the separation distance "d" must not become excessive in r.f. applications. That is, d must be significantly less than the wavelength of the highest r.f. frequency employed since a large gap will affect the characteristic impedance of the assembly and cause a mismatch within the tube 10. As mentioned earlier, such impedance mismatches may result in undesired reflections and oscillations.

Thus it is seen that the present invention provides an improved method for bonding thermally-mismatched elements of a traveling wave tube. By employing the teachings of the invention one can obtain a traveling wave tube wherein elements of materially different coefficients of thermal expansion may be fixed in close proximity. This enables metallic elements to act as heat sinks for ceramic elements. As a result of the invention, the risk of bond fracture occurring as a consequence of stress produced by the differing material expansions occurring at the bond interface is substantially eliminated. This risk is significant in prior art approaches employing direct or diffusion bonding between elements.

While this invention has been disclosed with reference to its presently preferred embodiment it is not limited thereto. Rather, this invention is limited only insofar as it is defined by the following set of patent claims and includes all equivalents thereof within its scope.

What is claimed is:

1. A traveling wave tube having a longitudinal axis and comprising, in combination;
    a) a slow wave structure comprising a plurality of cavities aligned substantially along said axis;
    b) each of said cavities being defined by a substantially parallel pair of pole pieces defining endwalls thereof;
    c) each of said pole pieces including a central aperture and an off-axis aperture, said central apertures of adjacent pole pieces being aligned along the longitudinal axis of said tube and said off-axis apertures being oppositely disposed with respect to said axis on alternate pole pieces;
    d) a gun assembly adjacent a first end of said traveling wave tube for launching an electron beam to travel through said slow wave structure of said tube;
    e) said tube having an input for receiving r.f. energy and coupled to said slow wave structure such that said r.f. energy interacts with said electron beam whereby the power of said r.f. energy is amplified;
    f) an output coupled to said slow wave structure for distributing amplified r.f. energy from said tube;
    g) a termination coupled to said slow wave structure for absorbing a portion of said received r.f. energy, said termination comprising a termination piece of substantially ceramic material and at least one element of metallic composition arranged to act as a heat sink for moderating the temperature of said ceramic termination piece in operation;
    h) a plate of predetermined metallic composition having a plurality of discrete convex elements on opposed sides thereof, said plate being located at an interface between said termination and said at least one metallic element and wherein said discrete convex elements respectively provide a first plurality of discrete points of contact between said plate and said termination piece and a second plurality of discrete points of contact between said at least one metallic element and said plate; and
    i) a metallic bond at each of said discrete points of contact fixing said plate to said termination piece and to said metallic elements, respectively.

2. A traveling wave tube as defined in claim 1 further characterized in that;
    a) said at least one metallic element comprise copper;
    b) said plate comprises copper;
    c) a surface of said termination piece comprises silver; and
    d) said plate is oriented so that a first surface of said plate is in contact with said termination piece and a second surface of said plate is in contact with a metallic element.

3. A traveling wave tube as defined in claim 1 wherein the convex elements of at least one side of said plate are rounded.

* * * * *